Patented Aug. 2, 1949

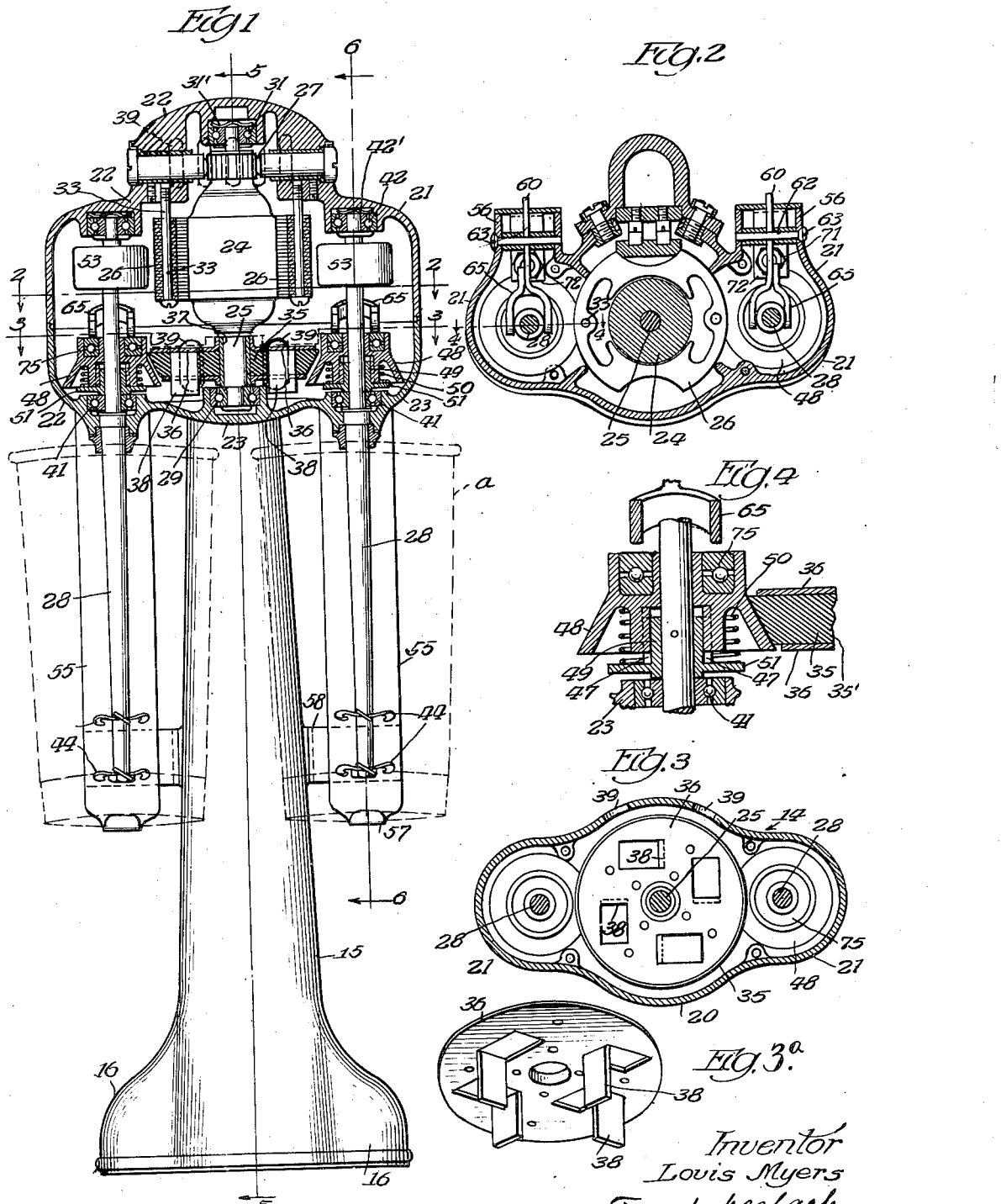

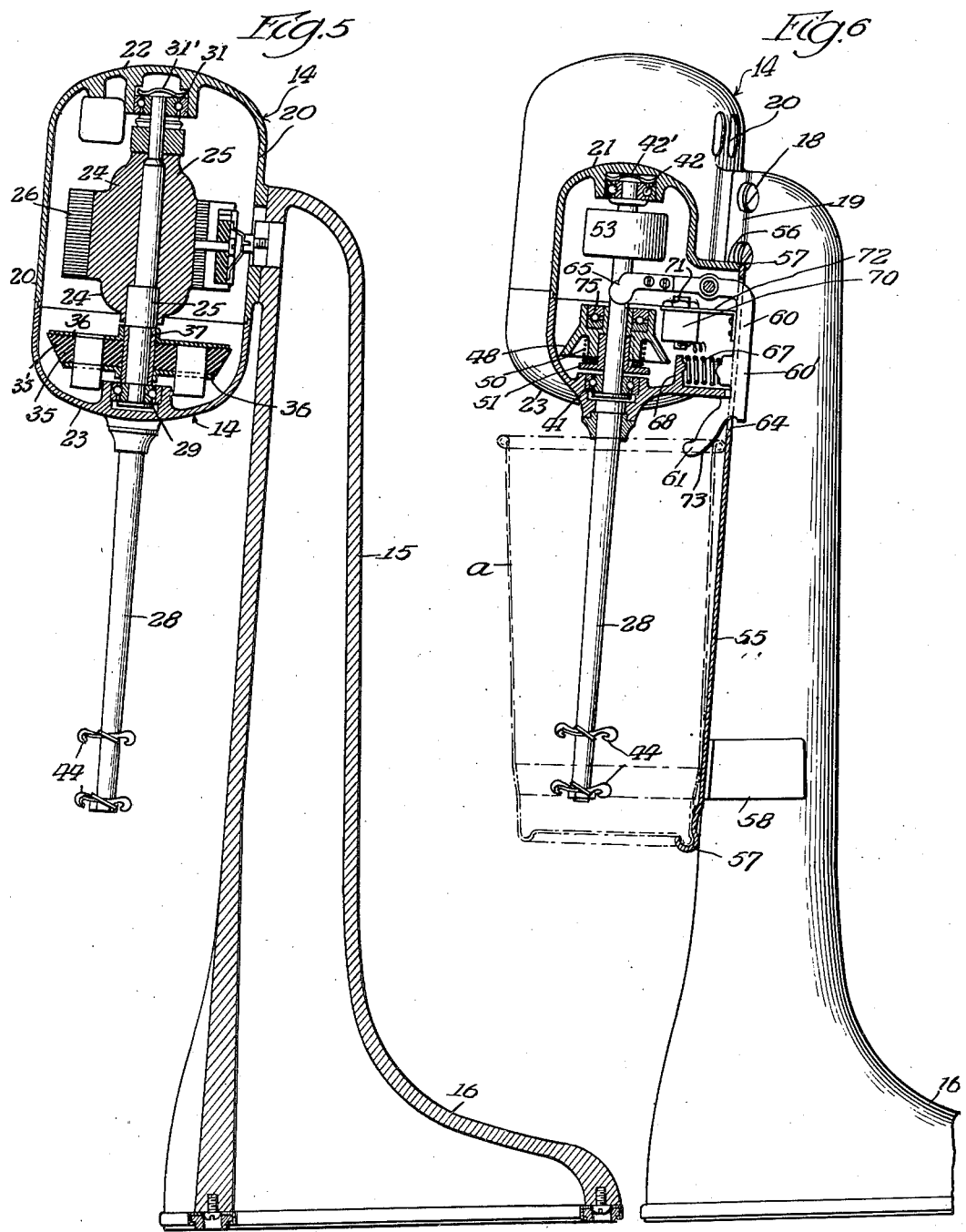

2,477,764

UNITED STATES PATENT OFFICE 2,477,764

ELECTRIC DRINK MIXER

Louis Myers, Rockford, Ill.

Application August 6, 1945, Serial No. 609,125

11 Claims. (Cl. 259—131)

The invention relates to drink mixers.

One object of the invention is to provide a drink mixer of the type which is adapted to simultaneously mix the contents of a plurality of receptacles and which provides for housing and enclosing substantially all of the operating parts, except the agitator shafts, for sanitary reasons.

Another object of the invention is to provide a drink mixer of this type in which placement of the receptacle in its operative position around a stationarily supported agitator shaft controls the operation of the agitator shafts.

Another object of the invention is to provide a drink mixer of this type which is compact and streamlined in construction and occupies little space on a counter or table.

Other objects of the invention will appear from the detailed description.

The invention consists in the several features hereinafter set forth and more particularly defined by claims at the conclusion hereof.

In the drawings:

Fig. 1 is a transverse section of a drink mixer embodying the invention, parts being shown in elevation.

Fig. 2 is a section taken on line 2—2 of Fig. 1.

Fig. 3 is a section taken on line 3—3 of Fig. 1.

Fig. 3a is a perspective of the air impeller on the motor driven drive wheel.

Fig. 4 is a vertical section taken on line 4—4 of Fig. 2.

Fig. 5 is a section taken on line 5—5 of Fig. 1.

Fig. 6 is a perspective of the combined receptacle guide and support.

The improved mixer comprises generally: a rigid supporting standard or column; a vertical electric motor disposed at the front of the upper end of the column; a pair of agitator shafts disposed at the sides of the motor; gearing for selectively driving either or both of the agitator shafts from the motor; a housing including a central portion and hollow lateral offsets, for completely enclosing the motor, the gearing and the upper portions of the agitator-shafts; stationary elements for supporting receptacles in operative position around the agitator-shafts, respectively; and devices controlled by the placement of the receptacles into their operative positions around the agitator shafts for automatically controlling the operation of the motor and the agitator-shafts.

A supporting standard comprises a rigid hollow column 15, the lower end of which is extended to form an enlarged base 16 which is adapted to rest on a counter or table. A housing, generally designated 14, is supported in front of the upper portion of the column 15 and secured by screws to laterally extending lugs 19 which are integrally formed on the upper end of said column. This housing comprises a central cylindrical portion 20 and a pair of hollow laterally projecting offsets 21, a top enclosing wall 22 for the central portion 20, and a bottom wall 23. The housing forms an enclosure for the motor, the upper portions and ends of the agitator-shafts 28, and the gearing for selectively driving the agitator-shafts from the motor, and substantially all operative portions of the mixer except the depending portions of the agitator-shafts, and is fixedly supported by the column 15.

The electric motor for driving the agitator-shafts 28 is disposed in the central cylindrical portion 20 of the housing in front of the upper portion of column 15 and comprises an armature 24, fields 26, brushes 27 and a motor-shaft 25 on which the armature is wound, as well understood in the art. The fields 26 are supported in the housing 14 by screws 33. The brushes 27 are mounted in the upper portion of a cylindrical portion 20 of the housing. Shaft 25 is journalled in a lower anti-friction bearing 29 which is carried in a socket in the lower wall 23 of the housing, and in an anti-friction bearing 31 confined in a socket in the top-wall 22 of the housing. A drive pulley 35 is fixed on shaft 25 immediately above bearing 29, for frictionally driving the agitator-shafts 28 and is enclosed by the housing 14. The drive pulley 35 comprises a body 35' of brake-material which is confined between disks 36 which are fixedly secured on a sleeve 37 which is fixedly secured to the lower end of shaft 25. The pulley body 35' has a conoidal periphery for frictionally driving the agitator-shafts 28 disposed on the opposite sides thereof. Tongues 38 are down-struck from the upper disk 36, extend through the body 35', and the lower disk 36, and project below said lower disk to form vanes for circulating air through the housing for cooling the motor and the friction pulley 35 and wheels driven thereby. Openings 39 are formed in the back of the housing 14 for the circulation of air through the housing 14 by said vanes. This exemplifies a fan-wheel combined with the drive pulley, for circulating air through the housing and cooling the motor and other enclosed parts. A leaf-spring 31' engages the anti-friction bearing 31 to compensate for expansion and contraction of the motor-shaft.

Depending agitator-shafts 28 are each journalled in an anti-friction bearing 41 carried in sockets in the lower-wall 23 of the housing and in an anti-friction bearing 42 carried in a socket in the upper-wall 22 of the housing. The upper portions of shafts 28 extend vertically across the chambers in the offsets 21 of the housing at opposite sides of the shaft 25 of the electric motor. Each shaft 28 extends downwardly from the housing and is provided at its lower end with agitators 44.

The bearings 41 and 42 support the agitator-shafts 28 against axial movement. A leaf spring 42' engages the upper end of each anti-friction bearing 42 to compensate for the expansion and contraction of the agitator-shafts.

A friction-wheel 48, which is selectively engageable with the pulley 35, is provided on each agitator-shaft 28 within the offset portions 21 of the housing 14. Each wheel 48 is provided with an upwardly facing conoidal friction-face engageable with the downwardly convergent friction-face on the pulley 35 and is slidably splined as at 47 to a sleeve 49 which is fixed on one of the agitator-shafts 28 immediately above a bearing 41, for disengagement of wheel 48 from pulley 35. A coil-spring 50 between the hub of wheel 48 and a flange 51 on each sleeve 49 normally urges the wheel 48 upwardly into engagement with the pulley 35. The control means, hereinafter described, is adapted to hold each wheel 48 disengaged from pulley 35, except when the motor is running. A flywheel 53 is fixedly secured to the upper portion of each agitator-shaft 28 adjacent its bearing 42 and is enclosed by the offsets 21 of the housing 14. These flywheels function to graduate the starting and stopping of the agitator-shafts. In this construction, the pulley 35, which is driven by the motor, is of greater diameter than the friction-faces on wheels 48 so that the agitator-shafts will be driven at a higher speed than the motor. This exemplifies gearing for selectively driving the agitator-shafts 28 from the motor and fly-wheels 53 which are completely enclosed by the housing 14.

The mixer comprises devices for stationarily supporting receptacles a in operative position around the agitator-shafts 28, respectively, which are elevated above the base 16 so that the receptacles may be lifted from below around the agitators 44 into position for mixing operations. Each of these devices comprises a strip 55 which is provided at its lower end with a hook 57 which is adapted to receive and support a rim on the lower end of the receptacle at the desired elevation for mixing the contents of the receptacle. The front face of each strip 55 is preferably concave for guiding the upper rim of the receptacle a during its placement into and out of its operative position around the agitator-shafts 28. The upper end of each strip 55 is secured to a rearward extension 56 on one offset 21 of the housing 14. The lower portion of each strip 55 is fixedly secured by a brace strip 58 to one side of the column 15. This construction exemplifies an elevated housing for the motor and the upper ends of stationarily supported agitator-shafts and combined supporting and guide strips at the sides of the column 15 for supporting the receptacles, and is simple and compact in construction for supporting a pair of receptacles in their operative positions around the agitator-shafts, supported from a single standard.

The upper rim of each receptacle, when it is placed on a hook 57 on strip 55, is held against said strip by a spring-pressed lever 60 which is provided with a depending arm 60' and a hook 61 on the lower end of said arm, between which and the front face of strip 55, the upper rim of the receptacle is gripped to hold the receptacle in operative position on strip 55. The hook 61 is provided with a cam-surface 73 which pressed the lever 60 away from the strip 55 when the upper rim is inserted between them. Each lever 60 is fulcrumed on a pin 63 which extends across the rearward extension 56 of an offset portion 21 of the housing. Each strip 55 is provided with a slot 64 through which the arm 60' of lever 60 is movable. The cam-surface 73 on said arm is adapted to engage the lower end of said slot to limit the rearward movement of said arm and the swinging movement of lever 60 in one direction. A coil-spring 67 is interposed between a lug 68 in the housing and the arm 60' of each lever 60 for normally pressing the cams 73 into engagement with strips 55. When the upper rim of the receptacle is inserted between the hook 61 and the strip 55, arm 60' is forced forwardly against the force of spring 67 so that said rim will be gripped by hook 61 and the receptacle will be held in its operative position around the agitator-shaft 28.

Lever 60 is also provided with a forwardly extending forked arm 65 which straddles a shaft 28 above wheel 48 and is adapted to hold said wheel disengaged from pulley 35 against the force of spring 50 until lever 60 is shifted by the upper rim of the receptacle a.

A push-buttom switch 70 is mounted on angle strip 72 and secured thereon by a nut 71 and is engageable by the arm 65 to hold the switch 70 open while said arm is depressed. Each strip 72 is secured to a strip 55. Switches 70 are included in parallel branches of one of the line conductors for the motor and the other conductor is directly connected to the motor so that upon the closing of either of the switches, the motor will start and remain in operation while one switch remains closed. Each spring 67 is of sufficient magnitude to hold its associated lever 60 in position to normally hold a switch 70 open and the wheel 48 depressed against the force of its associated spring 50 and is compressed to release the switch button and wheel 48 for engagement with pulley 35, when the top-rim of a receptacle a is forced between hook 61 and strip 55. An anti-friction thrust bearing 75 is carried in the hub of each wheel 48, the free upper member of which is engaged by the forked arm 65 to prevent wear between said arm and said wheel while the agitator-shafts are running down or starting.

The operation will be as follows: normally levers 60 will be pressed into positions by their springs 67 to hold wheels 48 disengaged from pulley 35 and to hold switches 70 open so that the motor will not operate. When drinks are to be mixed, the operator will place receptacles a around the lower portion of the agitator-shafts 28 and against strips 55 which will slidably guide the receptacles between cam-surfaces 73 on levers 60, then place the lower rim of the receptacle on hook 57 on strip 55, whereupon the receptacles a will be stationarily supported in operative position around the agitator-shafts 28. The upper beaded rims of the receptacles will be spring-held against strips 55 by hooks 61. The levers 60 will then be shifted against the force of springs 67 to release the buttons of switches 70 for closing the circuits through the electric motor and raising forks 65 to release wheels 48 so that springs 50 will press the peripheries of wheels 48 into driving relation with the pulley 35.

The receptacles may be simultaneously placed in both of the receptacle supporting devices. The operation of either of the levers 60 will close one switch 70 for the operation of the electric motor to independently control the driving engagement of one of the wheels 48 with the driving pulley 35, if only one receptacle is placed on a strip 55.

At the completion of the mixing operations, it is only necessary to release the receptacle or receptacles from hook 57 and lower them away from the agitator-shaft 28. As the lever 60 is released by the withdrawal of the upper rim of the receptacle, its coil-spring 67 will shift its arm 65 to engage the anti-friction bearing 75 and press wheel 48 downwardly against the force of spring 50 which will uncouple said wheel from pulley 35 and simultaneously arm 65 will release a switch 70 so that the circuit controlled thereby will be opened. The motor will continue to run while one receptacle is in operative position around either agitator-shaft 28. When no receptacle is so held, both switches 70 will be open and the motor will stop. The flywheels 53 graduate the starting and stopping of the agitator-shafts.

The invention provides a drink mixer with a plurality of depending shafts which are supported against axial movement and driving mechanisms which automatically control the operation of the shaft, for plural mixing operations and in which the placement of the receptacles in their supports automatically control the electric motor and the individual driving mechanisms for the agitator-shafts. The invention also exemplifies an electric drink mixer for simultaneous plural mixing operations in which the electric motor and the driving mechanisms for the depending agitator shafts are completely contained in a unitary housing for sanitary purposes. The invention also exemplifies an electric drink mixer in which the supporting and guide strips for the receptacles are disposed at the opposite sides of a single column and supported from the housing and the column which provides a compact construction which occupies minimum space and makes it possible to use a base which occupies little space on the counter or table on which the mixer is set. The invention also exemplifies a motor for simultaneous mixing in a plurality of receptacles which is streamlined and attractive in appearance.

The invention is not to be understood as limited to the details described, since these may be modified within the scope of the appended claims without departing from the spirit and scope of the invention.

Having thus described the invention, what I claim as new and desire to secure by Letters Patent is:

1. A drink mixer, comprising: a supporting standard provided with an enlarged base; a vertical motor in front of the upper portion of the standard and provided with a depending shaft; agitator-shafts at opposite sides of the motor, respectively; selectively engageable driving devices between the depending motor-shaft and the agitator-shafts each including a driving element slidably mounted on one of the agitator shafts; a housing supported on the upper end of and in front of the standard, including a central portion and offset portions enclosing the motor and its depending shaft, said driving devices, and the upper end portions of the agitator-shafts; bearings in the offset portions of the housing in which the upper portions of the agitator-shafts are journalled and supported against axial movement; strips depending from and having their upper ends fixedly secured to the offset portions of the housing at the back of the agitator-shafts, for guiding and supporting receptacles into operative position around the agitator-shafts, and having their lower ends terminating above the base, and provided with hooks for the lower rim of the receptacles; and levers mounted on and extending into the offset portions of the housing, controlled by the placement of the receptacles onto the hooks and into operative position around the agitator-shafts, for controlling the operation of the driving devices for the agitator-shafts by the motor, respectively.

2. A drink mixer, comprising: a supporting standard provided with an enlarged base; a vertical motor in front of the upper portion of the standard and provided with a depending shaft; agitator-shafts at opposite sides of the motor, respectively; selectively engageable driving devices between the depending motor-shaft and the agitator-shafts each including a driving element slidably mounted on one of the agitator shafts; a housing supported on the upper end of and in front of the standard, including a central portion and offset portions enclosing the motor and its depending shaft, said driving devices, and the upper end portions of the agitator-shafts; bearings in the offset portions of the housing in which the upper portions of the agitator-shafts are journalled and supported against axial movement; strips depending from and having their upper ends fixedly secured to the offset portions of the housing at the back of the agitator-shafts, for guiding and supporting receptacles into operative position around the agitator-shafts, and having their lower ends terminating above the base, and provided with hooks for the lower rim of the receptacles; braces between the standard and the lower ends of the strips; and levers, controlled by the placement of the receptacles onto the hooks and into operative position around the agitator-shafts, for controlling the operation of the driving devices for the agitator-shafts by the motor, respectively.

3. A drink mixer, comprising: a supporting standard provided with a base; a vertical motor in the front of the upper portion of the standard, including a depending shaft; a depending agitator shaft at one side of the motor and confined against axial movement; a device including a drive pulley on the motor-shaft and a wheel slidable on the agitator-shaft and a wheel slidable on the agitator-shaft into and out of driving relation with the pulley or selectively driving the agitator-shaft; a housing supported on the upper end of the standard, enclosing the motor and including an offset portion enclosing the upper portion and end of the agitator-shaft; bearings in the offset portion of the housing in which the upper portion of the agitator-shaft is journalled and supported against axial movement; a combined stationary guide and support for the receptacle, depending from the offset portion of the housing at the back of the agitator-shaft, having its lower end terminating above the base and provided at its lower end with a support for engaging the bottom of the receptacle; a lever pivotally mounted in the housing provided with means movable and engageable by the upper rim of the receptacle for holding and with an arm for shifting the wheel on the agitator-shaft out of driving relation with the pulley; and a spring for shifting the lever to shift said wheel out of said driving relation.

4. A drink mixer, comprising: a supporting standard provided with a base; a vertical motor in the front of the upper portion of the standard, including a depending shaft; a depending agitator-shaft at one side of the motor and confined against axial movement; a device including a drive pulley on the motor-shaft and a wheel slidable on the agitator-shaft into and out of driving relation with the pulley for selectively driving the agitator-shaft; a housing supported on the upper end of the standard enclosing the motor and including an offset portion enclosing the upper portion and end of the agitator shaft; bearings in the offset portion of the housing in which the upper portion of the agitator-shaft is journalled and supported against axial movement; a combined stationary guide and support for the receptacle, depending from the offset portion of the housing at the back of the agitator-shaft, having its lower end terminating above the base and provided at its lower end with a support for engaging the bottom of the receptacle; a spring for holding the drive wheel disengaged from the pulley; a lever pivotally mounted in the housing provided with shifting means engageable by and for holding the upper rim of the receptacle and with an arm for shifting the wheel on the agitator-shaft out of driving relation with the pulley, and a spring for shifting the lever to shift said wheel out of said driving relation, when the receptacle is removed from the combined guide and support.

5. A drink mixer, comprising: a supporting standard provided with a base; a vertical motor in the front of the upper portion of the standard, including a depending shaft; a depending agitator-shaft at one side of the motor and confined against axial movement; a drive pulley on the motor-shaft and a wheel slidably mounted on the agitator-shaft, movable into and out of driving relation with the pulley for driving the agitator-shaft; a housing supported on the upper end of the standard including a portion enclosing the motor and including an offset portion enclosing the upper portion and end of the agitator-shaft; bearings in the offset portion of the housing in which the upper portion of the agitator-shaft is journalled and supported against axial movement; a combined stationary guide and support for the receptacle depending from the offset portion of the housing at the back of the agitator-shaft, having its lower end terminating above the base and provided at its lower end with a support for engaging the bottom of the receptacle; a switch in the offset portion of the housing for controlling the operation of the motor; a lever pivotally mounted in the housing provided with shifting means engageable by and for holding the upper rim of the receptacle, and with an arm for controlling the switch and a fork on said arm for shifting the wheel on the agitator-shaft out of driving relation with the pulley; and a spring for shifting the lever to shift said wheel out of said driving relation and stop the motor, when the receptacle is removed from the combined support and guide.

6. A drink mixer, comprising: a supporting standard provided with a base; a vertical motor in the front of the upper portion of the standard, including a depending shaft; a depending agitator-shaft at one side of the motor and confined against axial movement; a device including a drive pulley on the motor-shaft and a wheel slidable on the agitator-shaft into and out of driving relation with the pulley for selectively driving the agitator-shaft; a housing supported on the upper end of the standard, enclosing the motor and including an offset portion enclosing the upper portion and end of the agitator-shaft; bearings in the offset portion of the housing in which the upper portion of the agitator-shaft is journalled and supported against axial movement; a fly-wheel enclosed by the offset of the housing and on the agitator-shaft; a combined stationary guide and support for the receptacle, depending from the housing at the back of the agitator-shaft, having its lower end terminating above the base and provided at its lower end with a support for engaging the bottom of the receptacle; a lever pivotally mounted in the housing provided with means movable and engageable by for holding the upper rim and with an arm in the offset portion of the housing for shifting the wheel on the agitator-shaft out of driving relation with the pulley, and a spring for shifting the lever to shift said wheel out of said driving relation.

7. A drink mixer comprising: a single stationary supporting standard provided with a base; a housing fixedly supported on the upper end of and in front of the standard, including a central portion and oppositely disposed offset portions; a vertical electric motor mounted in the central portion of the housing in front of the upper portion of the standard and including a depending drive shaft; vertical agitator-shafts at the opposite sides of the motor, respectively, having their upper ends extending into and journalled in the offset portions of the housing and confined against axial movement; selective engageable driving devices between the depending motor-shaft and the actuator shafts each including a driving element slidably mounted on one of the agitator shafts; in the offset portions of the housing; stationary receptacle guides at the sides of the standard, in back of the agitator-shafts and extending downwardly from the offset portions of the housing, for guiding of the receptacles into operative position; supports for the bottoms of the receptacles above the base of the standard and fixedly held on the lower ends of the guides; and means controlled by placement of the individual receptacles on their supports and into operative position around the agitator-shafts for individually controlling the engagement of the driving devices for operation by the motor.

8. A drink mixer comprising: a single stationary supporting standard provided with a base; a housing fixedly supported on the upper end of and in front of the standard, including a central portion and oppositely disposed offset portions; a vertical electric motor mounted in the central portion of the housing in front of the upper portion of the standard and including a depending drive shaft; agitator shafts at the opposite sides of the motor, respectively, having their upper ends extending into and journalled in the offset portions of the housing and confined against vertical movement; selective engageable driving devices between the depending motor shaft and the actuator shafts, in the offset portions of the housing; stationary receptacle guides at the sides of the standard, in back of the agitator shafts and extending downwardly from the offset portions of the housing, for guiding the receptacles into operative position; supports for the bottoms of the receptacles above the base of the standard and fixedly held on the lower ends of the guides; and means controlled by placement of the individual receptacles on their supports and into operative position around the agitator shafts for individually controlling the engagment of the driving devices and the operation by the motor.

9. A drink mixer comprising: a single stationary supporting standard provided with a base; a housing fixedly supported on the upper end of and in front of the standard, including a central portion and oppositely disposed offset portions; a vertical electric motor mounted in the central portion of the housing in front of the upper portion of the standard and including a depending drive shaft; agitator shafts at the opposite sides of the motor, respectively, having their upper ends extending into the offset portions of the housing and confined against axial movement; bearings for the agitator shafts in the offset portions of the housing in which the agitator shafts are journalled and supported against axial movement, selective engageable driving devices between the depending motor shaft and the depending actuator shafts in the offset portions of the housing, each including a driving element slidably mounted on an agitator shaft; stationary receptacle guides at the sides of the standard, in back of the agitator shafts and extending downwardly from and fixedly secured to the offset portions of the housing, for guiding the receptacles into operative position; vertical supports for the receptacles above the base of the standard and fixedly held on the lower ends of the guides; and means controlled by placement of the individual receptacles on their supports and into operative position around the agitator shafts for individually controlling the engagement of the driving devices for operation by the motor.

10. A drink mixer comprising: a single stationary supporting standard provided with a base; a housing fixedly supported on the upper end of and in front of the standard, including a central portion and oppositely disposed offset portions; a vertical electric motor mounted in the central portion of the housing in front of the upper portion of the standard and including a depending drive shaft; agitator shafts at the opposite sides of the motor, respectively, having their upper ends extending into the offset portions of the housing and confined against axial movement; bearings for the agitator shafts in the offset portions of the housing in which the agitator shafts are journalled and supported against axial movement; selective engageable driving devices between the depending motor shaft and the depending actuator shafts in the offset portions of the housing, each including a driving element slidably mounted on an agitator shaft; stationary receptacle guides at the sides of the standard, in back of the agitator shafts and fixedly depending from the offset portions of the housing for guiding the receptacles into operative position; supports for the bottoms of the receptacles above the base of the standard and on the lower ends of the guides; and means controlled by placement of the individual receptacles on their supports and into operative position around the agitator-shafts for individually controlling the engagement of the driving devices and the operation by the motor.

11. A drink mixer comprising: a single stationary supporting standard provided with a base; a housing fixedly supported on the upper end of and in front of the standard, including a central portion and oppositely disposed offset portions; a vertical electric motor mounted in the central portion of the housing in front of the upper portion of the standard and including a depending drive shaft; agitator-shafts at the opposite sides of the motor, respectively, having their upper ends extending into and journalled in the offset portions of the housing and confined against axial movement; selective engageable driving devices between the depending motor-shaft and the depending actuator shafts in the housing; stationary receptacle guides at the sides of the standard, in back of the agitator-shafts and fixedly depending from and secured to the offset portions of the housing for guiding the receptacles into operative position; braces between the standard and the lower portions of the guides; vertical supports for the receptacles on the lower ends of the guides above the base of the standard; and means controlled by placement of the individual receptacles on their supports and into operative position around the agitator-shafts for individually controlling the engagement of the driving devices for operation by the motor.

LOUIS MYERS.

REFERENCES CITED

The following references are of record in the file of this patent:

UNITED STATES PATENTS

| Number | Name | Date |
| --- | --- | --- |
| 1,171,477 | Thormaklen | Feb. 15, 1916 |
| 1,473,163 | Sas | Nov. 6, 1923 |
| 1,633,470 | Ball | June 21, 1927 |
| 1,764,337 | Nielsen | June 17, 1930 |
| 2,172,593 | Prince et al. | Sept. 12, 1939 |
| 2,218,808 | Brotheridge | Oct. 22, 1940 |
| 2,348,341 | Gough | May 9, 1944 |